United States Patent
DeCobert et al.

(10) Patent No.: US 7,312,425 B2
(45) Date of Patent: *Dec. 25, 2007

(54) PROGRAMMABLE SLOW-COOKER APPLIANCE

(75) Inventors: James E. DeCobert, Manchester, CT (US); Lorens G. Hlava, Clinton, MO (US); Charles T. Thrasher, Jr., Clinton, MA (US); William Levy, Hopedale, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/091,047

(22) Filed: Mar. 28, 2005

(65) Prior Publication Data

US 2005/0184048 A1 Aug. 25, 2005

Related U.S. Application Data

(63) Continuation of application No. 10/323,234, filed on Dec. 18, 2002, now Pat. No. 6,872,921, which is a continuation-in-part of application No. 09/802,174, filed on Mar. 8, 2001, now Pat. No. 6,573,483.

(60) Provisional application No. 60/196,273, filed on Apr. 5, 2000, provisional application No. 60/189,443, filed on Mar. 15, 2000.

(51) Int. Cl.
*A47J 37/06* (2006.01)
*H05B 1/02* (2006.01)

(52) U.S. Cl. .................. 219/433; 219/432; 219/442; 99/333; 99/403

(58) Field of Classification Search .............. None
See application file for complete search history.

(56) References Cited

U.S. PATENT DOCUMENTS

| | | | |
|---|---|---|---|
| 2,066,476 A | 1/1937 | Lacy |
| 2,265,295 A | 12/1941 | Layton |
| 2,700,723 A | 1/1955 | Lynch, Jr. |
| 2,872,562 A | 2/1959 | McNamara |
| 3,087,413 A | 4/1963 | Burroughs |
| 3,681,663 A | 8/1972 | Albers |
| 3,757,671 A | 9/1973 | Warshauer et al. |
| 3,798,418 A | 3/1974 | Reik et al. |
| 3,806,701 A | 4/1974 | Scott |
| 3,881,090 A | 4/1975 | Scott |

(Continued)

FOREIGN PATENT DOCUMENTS

FR 2 651 666 9/1989

(Continued)

OTHER PUBLICATIONS

S.A. SEB, Multi-Cuiseur, 1$^{st}$ Edition—Jun. 1995.

(Continued)

*Primary Examiner*—J. Pelham
(74) *Attorney, Agent, or Firm*—Hoffmann & Baron, LLP

(57) ABSTRACT

A programmable slow-cooker appliance uses an application-specific integrated circuit digital controller, in which a user sets a time and temperature for cooking a food item. The digital controller prevents the unit from functioning only as a "keep warm" appliance, and a unique design allows cooling of the application-specific integrated circuit digital programmable controller during cooking.

30 Claims, 12 Drawing Sheets

U.S. PATENT DOCUMENTS

| | | | |
|---|---|---|---|
| 3,904,852 A | | 9/1975 | Rivelli et al. |
| 3,908,111 A | * | 9/1975 | Du Bois et al. ............ 219/442 |
| 3,940,589 A | | 2/1976 | Tupper |
| 4,011,431 A | | 3/1977 | Levin |
| 4,187,412 A | | 2/1980 | Ernster et al. |
| 4,197,581 A | * | 4/1980 | Watrous et al. ............ 219/497 |
| 4,215,265 A | | 7/1980 | White |
| 4,241,288 A | | 12/1980 | Aoshima et al. |
| 4,307,287 A | * | 12/1981 | Weiss ........................ 219/442 |
| 4,309,584 A | | 1/1982 | Terakami |
| 4,313,051 A | | 1/1982 | Aoshima |
| 4,315,138 A | | 2/1982 | Miwa |
| 4,315,139 A | | 2/1982 | Onishi |
| 4,345,145 A | | 8/1982 | Norwood |
| 4,362,923 A | | 12/1982 | Aoshima et al. |
| 4,438,324 A | | 3/1984 | Narita et al. |
| RE31,595 E | | 6/1984 | Fischer et al. |
| RE31,596 E | | 6/1984 | Kicherer et al. |
| RE31,597 E | | 6/1984 | Fischer et al. |
| 4,455,480 A | | 6/1984 | Matsumoto et al. |
| 4,455,924 A | | 6/1984 | Wenzel |
| 4,551,590 A | | 11/1985 | Mahon |
| 4,566,802 A | | 1/1986 | Koehler |
| 4,574,183 A | | 3/1986 | Knauss |
| 4,591,698 A | | 5/1986 | Chang |
| 4,610,238 A | * | 9/1986 | Veth ........................ 126/21 R |
| 4,626,662 A | | 12/1986 | Woolf |
| 4,644,137 A | | 2/1987 | Asahi et al. |
| 4,649,810 A | * | 3/1987 | Wong ........................ 99/326 |
| 4,668,878 A | | 5/1987 | Wyss |
| 4,672,179 A | | 6/1987 | Onishi et al. |
| 4,674,890 A | | 6/1987 | Kojima et al. |
| 4,682,012 A | | 7/1987 | Wolf et al. |
| 4,687,910 A | * | 8/1987 | Aoshima et al. ............ 219/506 |
| 4,695,683 A | | 9/1987 | Wingler et al. |
| 4,695,710 A | | 9/1987 | Yamashita et al. |
| 4,742,864 A | | 5/1988 | Duell et al. |
| 4,749,874 A | | 6/1988 | Meisner et al. |
| 4,764,715 A | | 8/1988 | Kowalewski et al. |
| 4,789,761 A | | 12/1988 | Malone et al. |
| 4,791,263 A | | 12/1988 | Groeschel, Jr. |
| 4,803,920 A | | 2/1989 | Kowalics et al. |
| 4,812,623 A | | 3/1989 | Haden et al. |
| 4,817,510 A | | 4/1989 | Kowalics et al. |
| 4,835,349 A | | 5/1989 | Weber |
| 4,841,496 A | | 6/1989 | Adams et al. |
| 4,857,758 A | | 8/1989 | Rigazio et al. |
| 4,884,626 A | | 12/1989 | Filipowski |
| 4,959,512 A | | 9/1990 | Cole et al. |
| 4,995,312 A | | 2/1991 | Leiros |
| 5,111,026 A | | 5/1992 | Ma |
| 5,156,082 A | | 10/1992 | Fukuda et al. |
| 5,191,231 A | | 3/1993 | Berry |
| 5,429,039 A | | 7/1995 | Chang |
| 5,430,598 A | | 7/1995 | Rodolfo et al. |
| 5,477,029 A | | 12/1995 | Skutt et al. |
| 5,497,695 A | | 3/1996 | Canela |
| 5,539,185 A | | 7/1996 | Polster |
| 5,567,458 A | | 10/1996 | Wu |
| 5,595,105 A | | 1/1997 | Kang |
| 5,596,552 A | | 1/1997 | Lim |
| 5,613,423 A | | 3/1997 | Polster |
| 5,615,604 A | | 4/1997 | Chenglin |
| 5,637,248 A | | 6/1997 | Park |
| 5,658,480 A | * | 8/1997 | Tennant et al. ............ 219/519 |
| 5,662,025 A | * | 9/1997 | Yoo ........................ 99/332 |
| 5,727,448 A | | 3/1998 | Sa |
| 5,734,149 A | | 3/1998 | Skutt et al. |
| 5,771,207 A | | 6/1998 | Muroi et al. |
| 5,796,077 A | | 8/1998 | Jo |
| 5,829,341 A | | 11/1998 | Lin |
| 5,834,718 A | | 11/1998 | Amonett |
| 5,890,418 A | | 4/1999 | Song |
| 5,910,265 A | | 6/1999 | Baker et al. |
| 6,083,543 A | | 7/2000 | Kim et al. |
| D433,869 S | | 11/2000 | Wong et al. |
| 6,173,643 B1 | | 1/2001 | Qian et al. |
| 6,188,046 B1 | * | 2/2001 | Barrow ........................ 219/433 |
| 6,191,393 B1 | | 2/2001 | Park |
| 6,196,113 B1 | | 3/2001 | Yung |
| 6,229,507 B1 | | 5/2001 | Nakamura et al. |
| 6,246,831 B1 | * | 6/2001 | Seitz et al. .................. 219/483 |
| 6,274,847 B1 | | 8/2001 | Hlava et al. |
| 6,299,921 B1 | | 10/2001 | Löffler et al. |
| D450,528 S | | 11/2001 | Rossman |
| 6,318,247 B1 | * | 11/2001 | Di Nunzio et al. ........... 99/348 |
| D451,335 S | | 12/2001 | Rossman |
| 6,362,459 B1 | | 3/2002 | Schmidt |
| 6,509,550 B1 | | 1/2003 | Li |
| 6,573,483 B1 | | 6/2003 | DeCobert et al. |
| 6,587,739 B1 | | 7/2003 | Abrams et al. |
| 6,740,855 B1 | | 5/2004 | DeCobert et al. |
| 6,872,921 B1 | | 3/2005 | DeCobert et al. |
| 6,873,876 B1 | * | 3/2005 | Aisa .......................... 219/506 |
| 7,109,445 B2 | | 9/2006 | Patterson et al. |
| 2003/0173350 A1 | | 9/2003 | Takegoshi |
| 2005/0029249 A1 | | 2/2005 | Wanat |
| 2005/0051034 A1 | | 3/2005 | Cheng |
| 2006/0151463 A1 | | 7/2006 | Jian |

FOREIGN PATENT DOCUMENTS

| | | |
|---|---|---|
| GB | 2 061 091 A | 5/1981 |
| JP | 05-317164 | 12/1993 |
| JP | 06-327553 | 11/1994 |
| JP | 07/051158 | 2/1995 |
| JP | 07-136059 | 5/1995 |
| JP | 07-241236 | 9/1995 |
| JP | 08-140833 | 6/1996 |
| JP | 10-225373 | 8/1998 |
| JP | 11-137419 | 5/1999 |
| JP | 11-313761 | 11/1999 |
| JP | 2001-070139 | 3/2001 |
| JP | 2001-297865 | 10/2001 |
| JP | 2002-039546 | 2/2002 |
| JP | 2003-045630 | 2/2003 |

OTHER PUBLICATIONS

SEB 1999 Catalog, Vitasaveur, pp. 30-31.
SEB Tefal Multicuiseur/Multicooker, undated.
Selected portions of West Bend Housewares, LLC's Answers to Holmes Group, Inc.'s First Set of Interrogatories (Nos. 1-19).
Selected portions of West Bend Housewares, LLC's Answers to Holmes Group, Inc.'s First Request for Production of Documents and Things.
Selected portions of Focus Products Group, LLC's Answers to Holmes Group, Inc.'s First Set of Interrogatories.
Selected portions of Focus Products Group, LLC's Answers to Holmes Group, Inc.'s First Request for Production of Documents and Things.
Selected portions of West Bend Housewares LLC's Supplemental Answers to Holmes Group, Inc.'s Interrogatories Nos. 1, 2, 4, 5, 7-9, and 17.
Selected portions of West Bend Housewares LLC's Second Supplemental Answers to Holmes Group, Inc.'s Interrogatories Nos. 2, 4, 12 and 15.
Selected portions of Euro-Pro's Objections and Responses to Holmes' First Set of Document Requests.
Invalidity and Non-infringement Chart Submitted by Euro-Pro in response to Holmes's Interrogatories, U.S. Patent No. 6,573,483.
Invalidity and Non-infringement Chart Submitted by Euro-Pro in response to Holmes's Interrogatories, U.S. Patent No. 6,740,855.
Invalidity and Non-infringement Chart Submitted by Euro-Pro in response to Holmes's Interrogatories, U.S. Patent No. 6,872,921.

West Bend Housewares, LLC's Answer to Complaint and Counterclaim.

Focus Products Group, LLC's Answer to Complaint and Counterclaim.

Euro-Pro's First Amended Answer to First Amended Complaint and Counterclaim.

Rival "*Make Things Better For You*", 1977-1978 Catalogue, p. 3.

Chefline Stainless Model No. CEC-121E MiCom Cooker User Manual and translation, undated.

Pictures of Chefline Stainless Steel Electric Cooker, undated.

Panasonic SR-FU15AP Electronic Rice Cooker/Warmer, Operating Instructions, undated.

Hamilton Beach Model No. 415 Removable Liner 4 Qt. Slow Cooker, Operating Manual, undated.

Pictures of Rival Crock•Pot® Slow Cooker/Server, undated.

Pictures of Sears Crock Watcher, undated.

Panasonic Model No. SR-CF05P Electronic Rice Cooker/Warmer Instruction Manual, undated.

Farberware Millennium Programmable Pressure Cooker Model No. FPC400 Use & Care Instructions, 2000.

Pictures of Cook's Essentials Programmable Pressure Cooker, undated.

Defendants' Motion for Partial Summary Judgment on Invalidity of U.S. Patent Nos. 6,573,483 and 6,740,855, 05-CV-11367.

Defendants' Memorandum in Support of Their Motion For Partial Summary Judgment on Invalidity of U.S. Patents Nos. 6,573,483 and 6,740,855 and Exhibits A through F thereto, 05-CV-11367 WGY.

Defendants' Statement of Material Facts As To Which There Are No Genuine Issues of Dispute and White Defendants to Summary Judgment of Invalidity, 05-CV-11367 WGY.

Declaration of Dr. Barry N. Feinberg in Support of Defendants' Motion for Partial Summary Judgment on Invalidity of U.S. Patent Nos. 6,573,483 and 6,740,855.

Transcript of Markman hearing before Honorable Judge Young, 05-CV-11367 WGY.

Holmes' Response to Defendants Memorandum in Support of Their Motion for Partial Summary Judgment on Invalidity of U.S. Patent Nos. 6,573,483 and 6,740,855.

Holmes' Counter-Statement of Material Facts as to Which A Genuine Issue of Dispute Exists in Support of Holmes' Response to West Bend's Motion for Partial Summary Judgment on Invalidity of U.S. Patent Nos. 6,573,483 and 6,740,855.

(Exhibit 1) Declaration of Alan M. Sack in Support of Holmes Opposition to Defendants' Motion for Partial Summary Judgment on invalidity of U.S. Patent Nos. 6,573,483 and 6,740,855 and Exhibits A through D thereto.

(Exhibit 2) Declaration of Professor Ronda J. Robotham in Support of Plaintiff's Response to Defendants' Motion for Partial Summary Judgment on Invalidity of U.S. Patent Nos. 6,573,483 and 6,740,855 and Exhibit A thereto.

(Exhibit 3) Declaration of Professor Davis L. Trumper in Support of Plaintiff's Response to Defendants' Motion for Partial Summary Judgment on Invalidity of U.S. Patent Nos. 6,573,483 and 6,740,855 with Exhibit A thereto.

West Bend's Reply Memorandum Supporting its Motion for Partial Summary Judgment on Invalidity of U.S. Patent Nos. 6,573,483 and 6,740,855.

Rival product information sheets for Model Nos. 4310, 4356, 4318, and 4450.

User's Manual: *Moulinex* CUITOUT Electronic Cooking Robot, Moulinex. and translation.

Product Sheet: Per Le Cotture Voluminose . . . , Moulinex, and translation.

Photographs of the Box "*Moulinex* Cuitout—All in one Cooker", Undated with translation of one box panel.

Photographs of Moulinex Cuitout device, undated.

Rival Crock-Pot® Slow Electric Stoneware Cooker instruction manual, pre—2002.

Farberware® Millennium® Use & Care Instructions Manual (1999).

* cited by examiner

PROGRAMMABLE SLOW-COOKER APPLIANCE

This application claims priority to Provisional Application 60/189,443, filed Mar. 15, 2000, and to Provisional Application 60/196,273, filed Apr. 5, 2000. This application is a continuation of U.S. patent application Ser. No. 10/323,234 filed on Dec. 18, 2002 now U.S. Pat. No. 6,872,921 which is a continuation-in-part of U.S. patent application Ser. No. 09/802,174, filed Mar. 8, 2001 now U.S. Pat. No. 6,573,483. These four applications are hereby incorporated by reference.

BACKGROUND OF THE INVENTION

Time and convenience are in short supply for homemakers wishing to supply a home-cooked meal to family members. Some appliances, such as slow-cooker appliances, attempt to meet this need by providing all-day cooking while a homemaker is absent. Such appliances, however, tend to be of the type where only one temperature and all day cooking is possible, regardless of the food item, and thus potentially subjecting the food item to over- or under-cooking. Another option may be to use a cooking unit with a controller, where a user may set a time or temperature desired. These units, however, tend to be quite a bit larger and more expensive than slow-cooker appliances. If these units are of more reasonable size, they also suffer because the controller inevitably must be placed near the heating element.

What is needed is a cooking appliance in which the user retains control over the time and temperature of cooking, but which is small enough to be convenient. What is needed is a slow-cooker unit in which the controller does not become overheated and damaged by the heating element.

SUMMARY OF THE INVENTION

One embodiment of the invention is a programmable slow-cooker appliance, including a heating unit, which includes upstanding sidewalls and a bottom wall. The sidewalls and bottom encompass a heating area. The appliance includes a heating element mounted on the inner surface of the interior wall of the heating unit. In one embodiment, the cooking area may also encompass a cooking unit inside the heating unit, suitable for holding food to be cooked. The appliance includes an application specific integrated circuit programmable controller mounted on a side wall of the appliance, and preferably mounted via a controller housing, which acts to insulate the application specific integrated circuit controller from the heat of the appliance, preferably via a unique system of a heat sink and ventilation. The housing, on the side of the slow-cooker appliance, utilizes ventilation holes on its bottom and top to encourage a chimney effect, in which cool air from the surroundings is drawn into ventilation slots or holes at the bottom of the housing. This air cools the controller, and the air is then expelled from ventilation holes on the top of the housing, convecting heat away from the controller.

Another aspect of the invention is a method of using the slow-cooker appliance to ensure that food is cooked according to the desires of a user. The user provides a food item and places the food item into the slow-cooker appliance, as described above. The user selects a cooking temperature and time using an application specific integrated circuit controller mounted to a housing for the controller on a sidewall of the slow-cooker appliance. The method also includes changing the temperature automatically to a lower temperature after the selected time. The cooking time according to one embodiment may not be set less than four hours, and the temperature may not be set for less than 150 degrees Fahrenheit (66 degrees Celsius). This prevents a user from accidentally setting the cooker to a "warm" temperature, in which food would only be warmed but not cooked thoroughly before consumption. In one embodiment, if the user sets no time or temperature, but merely turns the cooker on, the cooker defaults to a particular time and temperature, set by the user or the factory, such as a default setting of four hours and 175 degrees Fahrenheit, or a default setting of eight hours and 150 degrees Fahrenheit.

DETAILED DESCRIPTION OF THE DRAWINGS AND PREFERRED EMBODIMENTS

Figure 1:
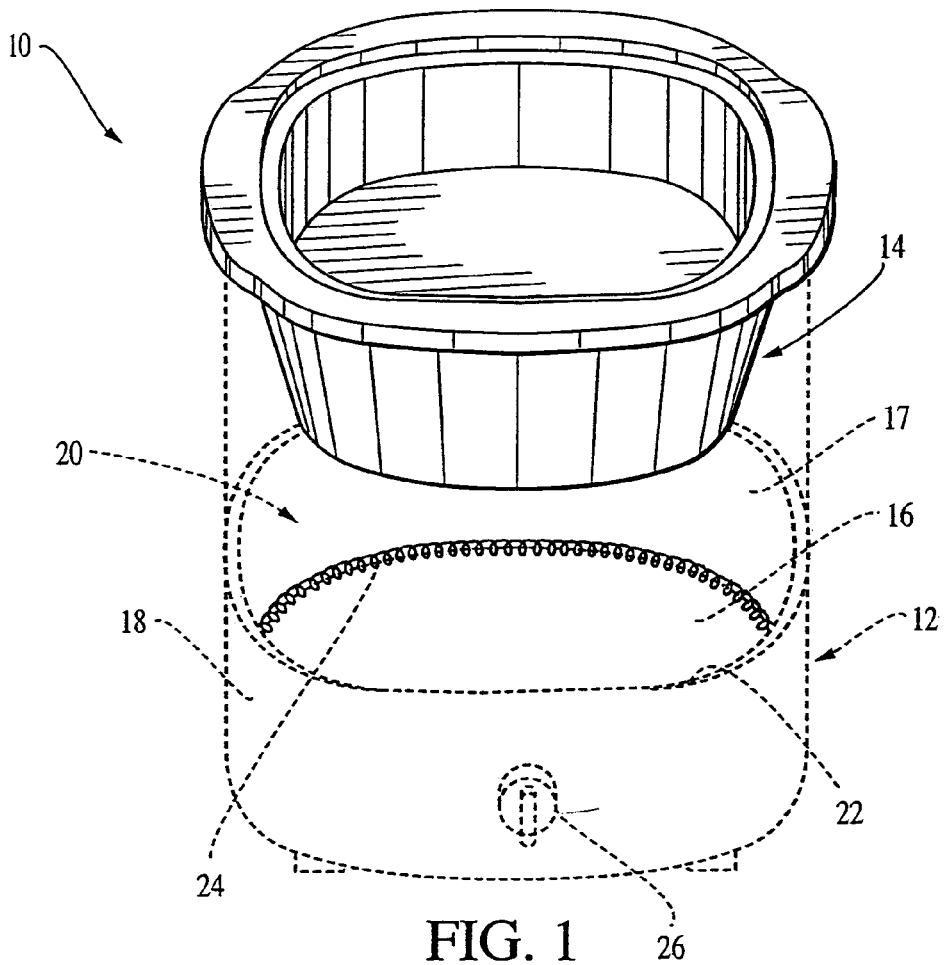
FIG. 1 is a perspective view of an embodiment of a prior art slow-cooker appliance having an oval shape.

Referring to FIG. 1, one prior art embodiment of a food-heating slow-cooker appliance 10 is shown. The appliance 10 preferably comprises a heating unit 12 and a cooking unit 14. An exemplary slow-cooker appliance 10 may be a Crock-Pot® Slow Cooker made by The Holmes Group of Milford, Mass. The heating unit 12 preferably has a bottom 16 and a continuous outer sidewall 18. The bottom 16 and an interior sidewall 17 define a well-like heating chamber 20 having an oval cross-section, and the interior sidewall 17 defines an annular lip 22 at an upper edge of the outer sidewall 18 and the interior sidewall 17. The heating chamber 20 has a heating element 24 disposed therein and mounted to the heating unit 12, either under the bottom 16 or additionally between the outer sidewall 18 and the interior sidewall 17. A control switch 26 is conventionally used to provide electricity to the heating element 24. The heating element 24 functions to heat the cooking unit 14 via the heating chamber 20.

Figure 2:
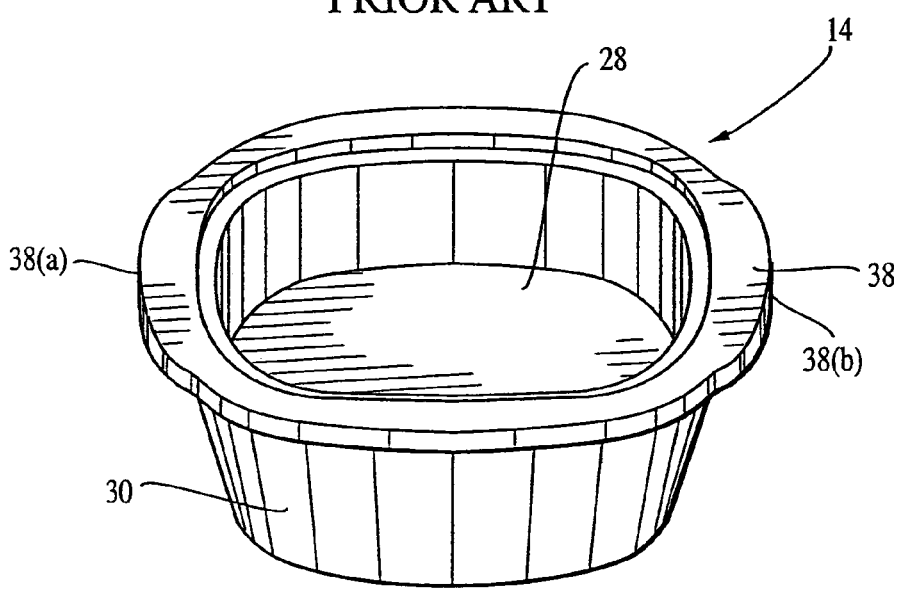
FIG. 2 is a perspective view of a prior art embodiment of a cooking unit 14 which may be utilized with the appliance of FIG. 1.

As shown in FIG. 2, the cooking unit 14 has a bottom 28 with preferably a continuous sidewall 30 upstanding therefrom. The continuous sidewall 30 preferably has an annular lip 38 projecting in flange-like fashion from the upper end thereof and a substantially oval cross-section. The cooking unit 14 is adapted to be at least partially received within the heating unit 12 with the annular lip 38 of the cooking unit 14 preferably engaging the annular lip 22 of the heating unit 12, supporting the cooking unit 14 within the heating unit 12. Preferably, the annular lip 38 further defines a pair of handle portions 38(a) and 38(b) to facilitate lifting the cooking unit 14. The cooking unit 14 is preferably made of ceramic with a coating of conventional glazing compound.

The thermal and heat retaining properties of the ceramic cooking unit 14 allow it to conduct heat from the heating chamber 20 through the sidewall 30. This provides even heating throughout the unit 14.

Figure 3:
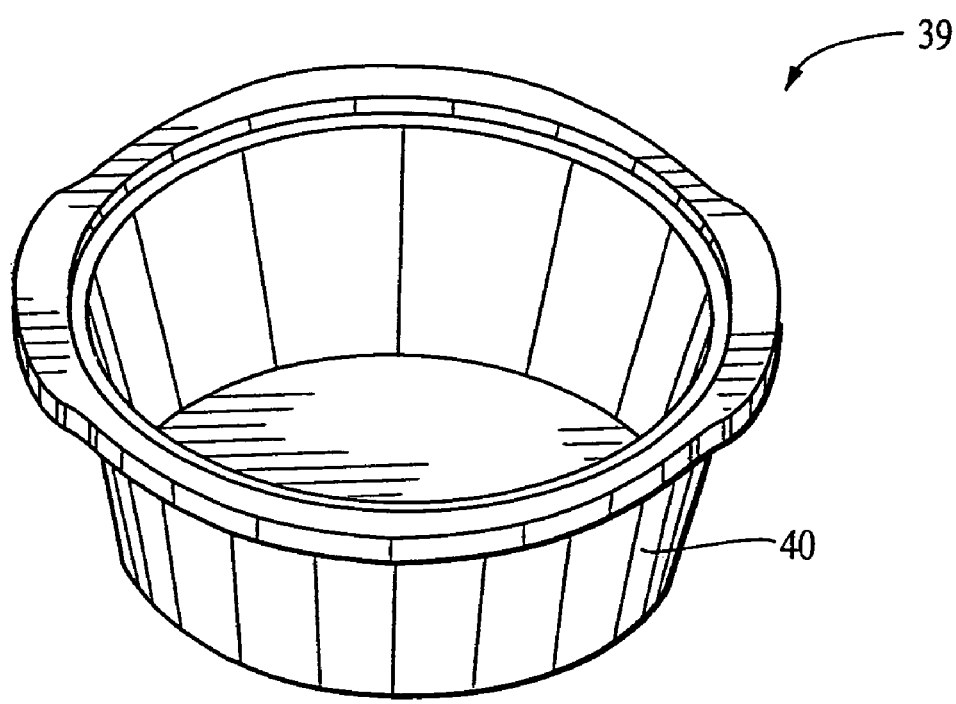
FIG. 3 is a perspective view of a prior art cooking unit 39 similar to that shown in FIG. 2, but having a circular shape.
Figure 4:
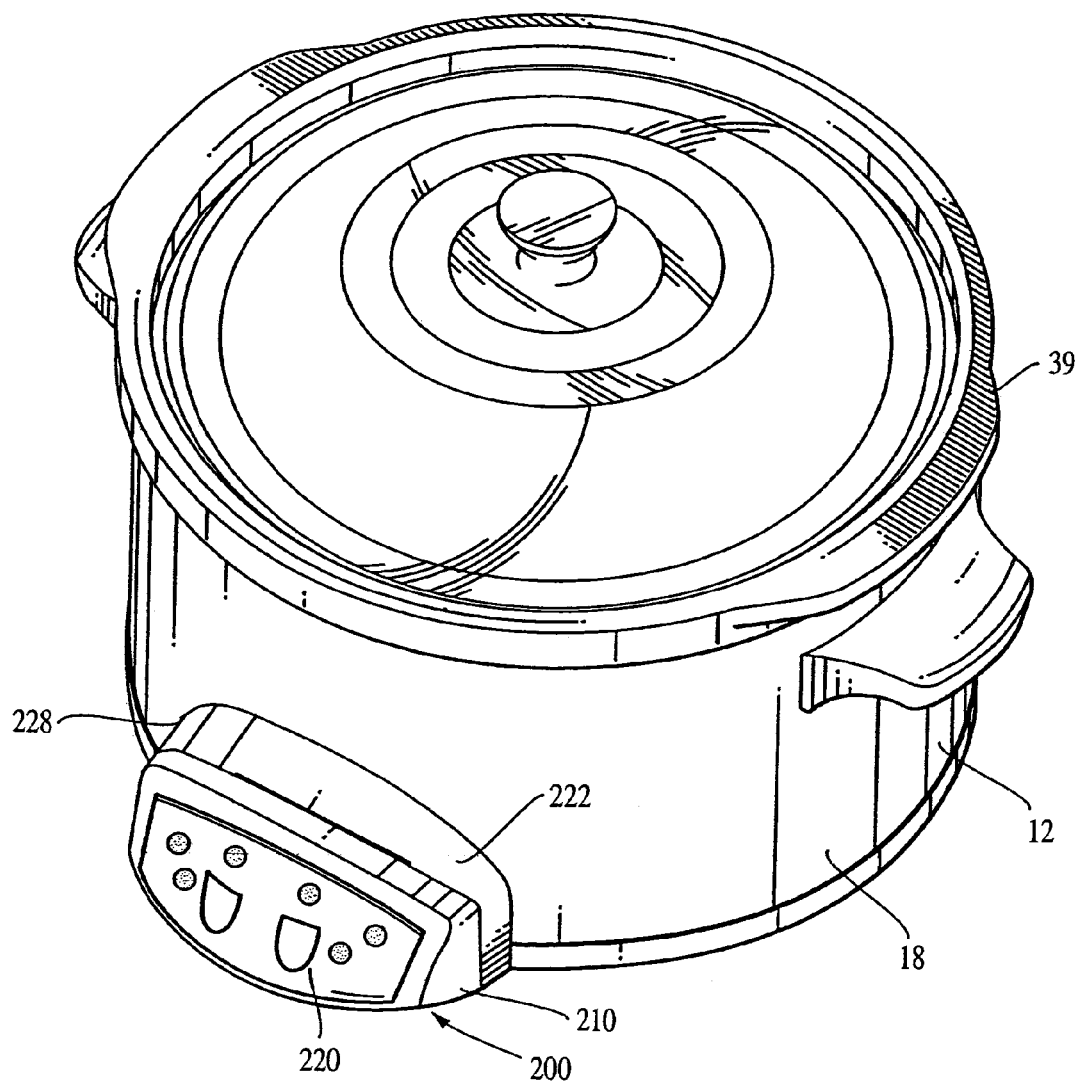
FIG. 4 is a perspective view of a slow-cooker appliance incorporating the present invention.

As shown in FIG. 3, an alternative embodiment of the appliance 10 includes a cooking unit 39 having a sidewall 40 and a substantially circular cross-section. This embodiment is preferably adapted to fit within a heating unit having a complementary circular heating chamber. This cooking unit 39 is used in an embodiment of the present invention shown in FIG. 4.

In use, the heating unit 12 is provided with a first cooking unit 39. The heating element 24 (not shown) may be powered on and off as necessary to supply heat at a maintained temperature to the cooking unit 39 and the heating chamber via a programmable control 200. The control 200 preferably includes a circuit board housing 210, a control panel 220, and an insulation shield 222 assembled together for attachment to the outer sidewall 18 of the heating unit 12. The interior of the housing 210 contains a printed circuit board 254 (shown in FIG. 7) containing electronic components of the control.

Figure 5:
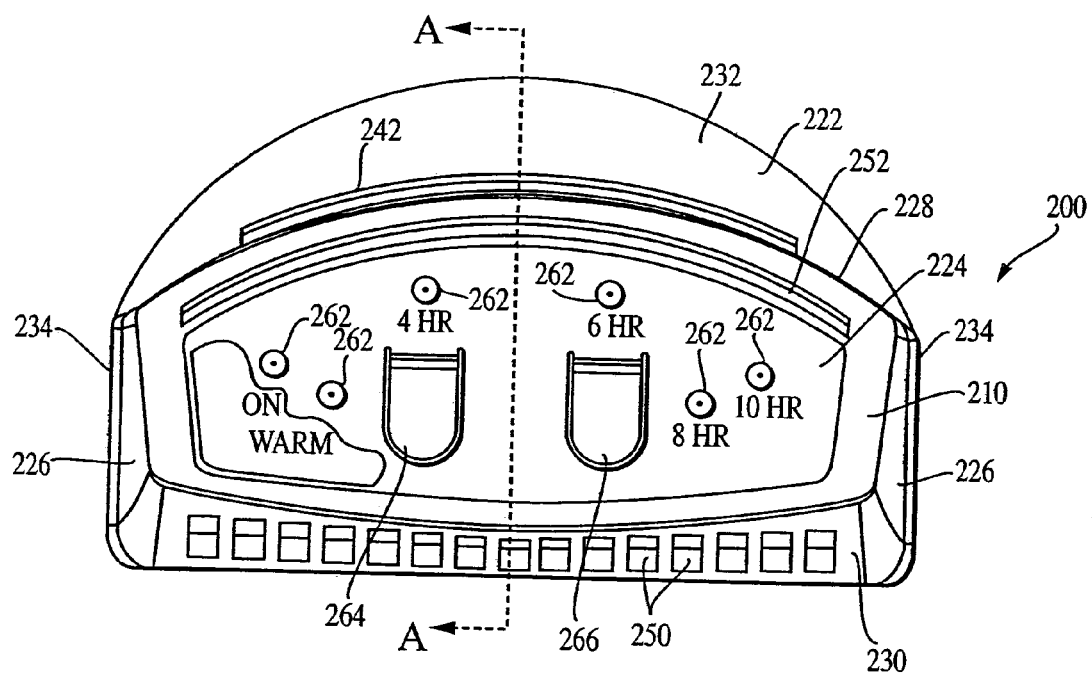
FIG. 5 is a detailed plan view of a portion of the control 200 of the embodiment of FIG. 4.
Figure 6:
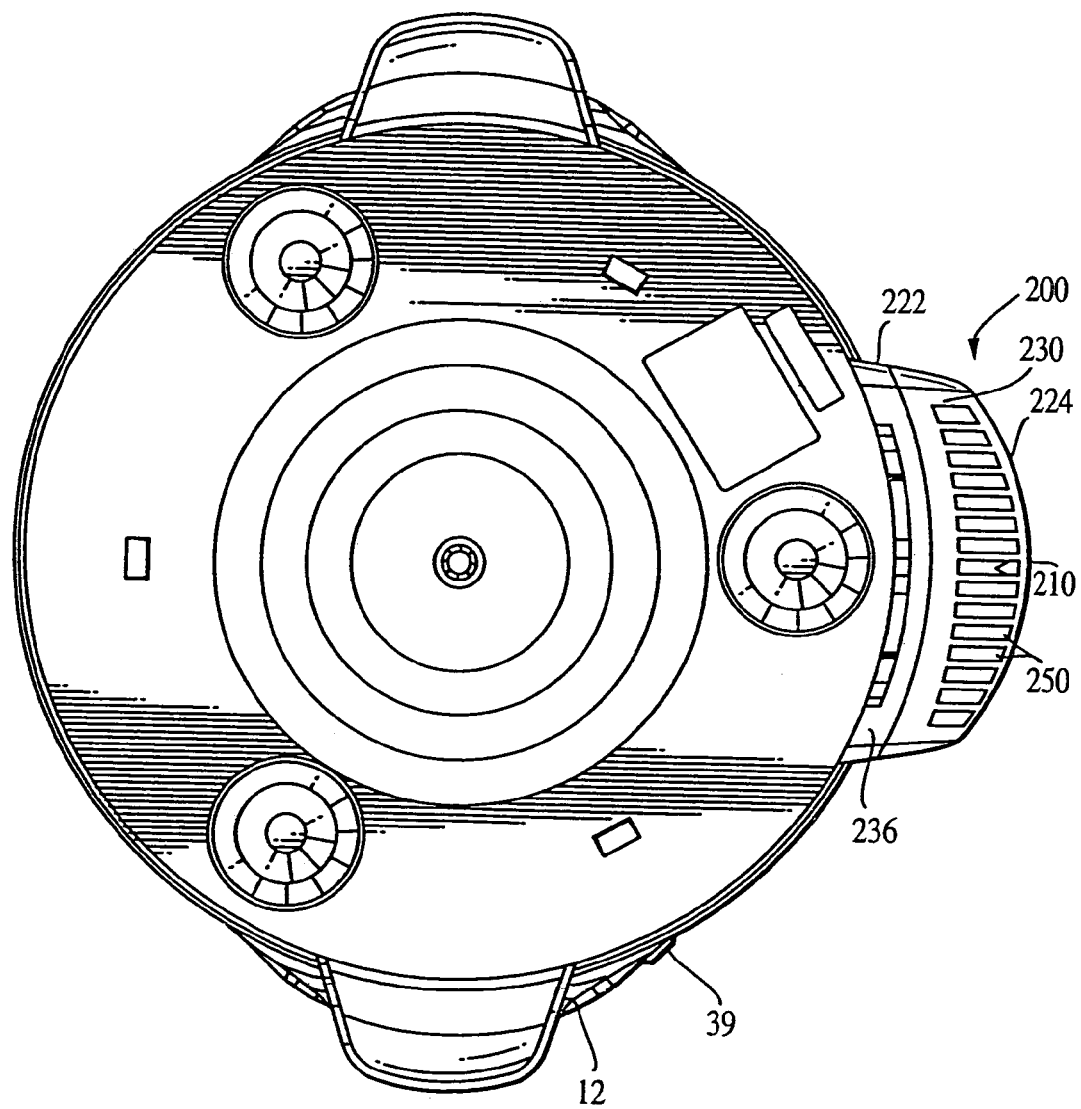
FIG. 6 is a bottom plan view of the embodiment of FIG. 4.

As shown in FIGS. 5 and 6, the housing 210 preferably includes a control panel user interface 224 located on an inclined front surface of the housing 210. Preferably, the housing 210 and insulation shield 222 are made from a thermoplastic material such as polypropylene. A pair of side walls 226, a top wall 228, and bottom wall 230 are preferably located adjacent the control panel 224 and support the control panel 224 in an inclined position away from the front of the cooking appliance 10. This gives the user access to the control panel 224, and also locates the controls and componentry within the housing 210 away from a significant amount of the heat generated by the appliance 10. The printed circuit board 254 may be mounted via threaded screws 255 to rearwardly projecting screw receiving portions 258 on the rear side of the housing 210.

The control panel 224 includes a plurality of indicator lights, such as LEDs 262, spaced on the front panel 224. As is well-known in the art, a variety of other indicator devices may be provided, including digital readouts, audible alarms, liquid crystal displays, incandescent lamps or fluorescent readouts. Preferably, the control panel 224 also includes a plurality of cantilevered portions 264 and 266 as shown in FIG. 5. The cantilevered portions 264, 266 preferably include rearwardly projecting fingers 268 (shown in FIG. 7) which translate the depression of the portions 264, 266 toward the rear portion of the housing 210. The fingers 268 are preferably used to depress pushbutton switch portions located on the circuit board 254. A water-impermeable label membrane may be applied over the front of the control panel 224 to label the indicators 262 and cantilevered portions 264 and 266 for the user. The membrane may also protect the front control panel 224 from damage from spilled foods or liquids and facilitate cleaning.

To further protect the electronic componentry within the housing 210 from the heat generated by the appliance 10, the annular shield member 222 is preferably sized for interposition between the heating unit 12 and the housing 210. In particular, as shown in FIGS. 5 and 6, the shield 222 includes a top wall 232, a pair of side walls 234, and a bottom wall 236. The shield 222 acts as a ventilated spacer to hold the electronic components and the housing 210 at a distance away from sidewall of the cooking unit 12.

Figure 7:
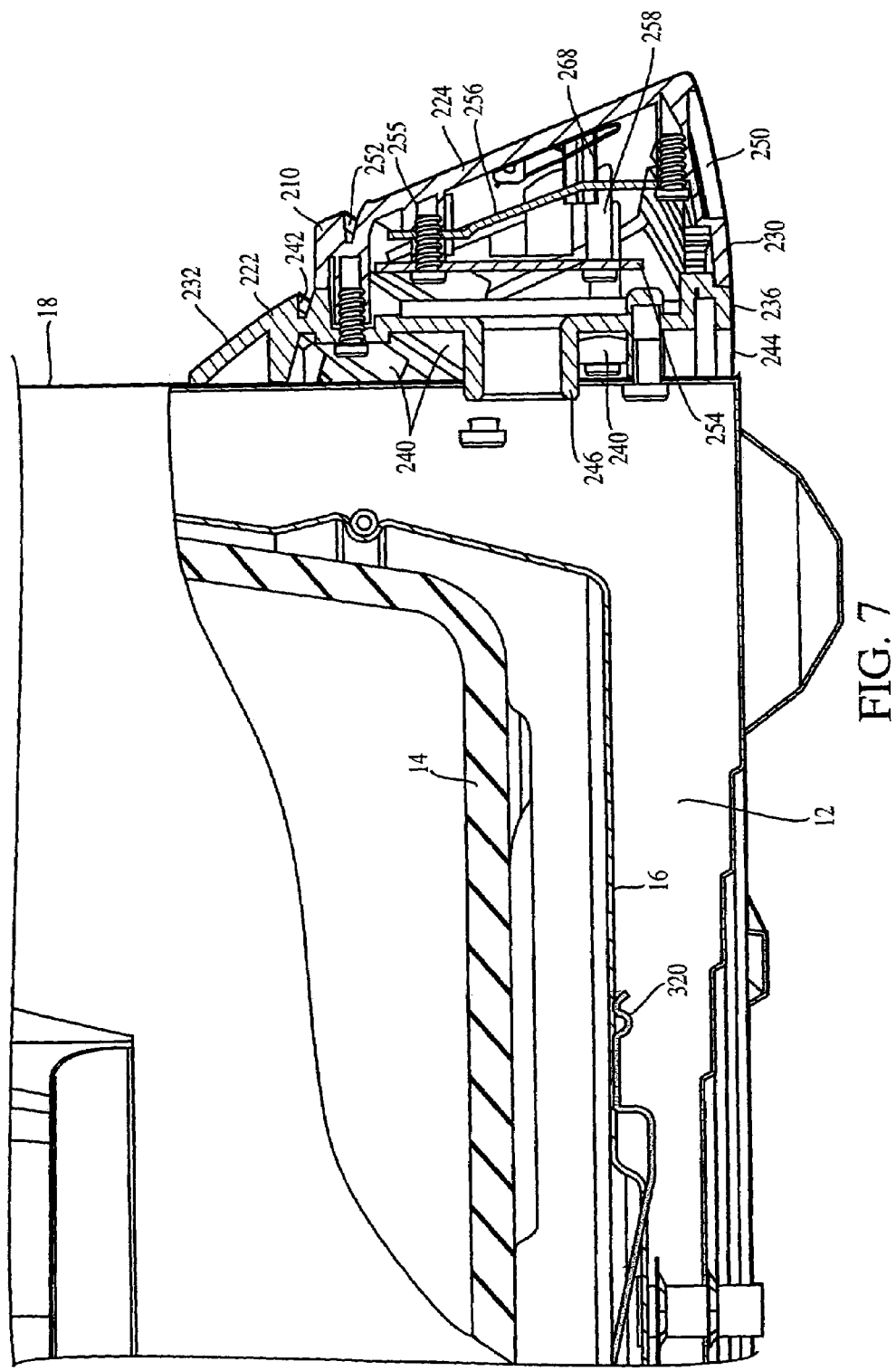
FIG. 7 is a side cutaway view of the embodiment of FIG. 4.

In order to dissipate heat that may otherwise be retained between the cooking unit 12 and the rear of the housing 210, an air circulation space is provided within the shield. In particular, as shown in the side cutaway view of FIG. 7, the air space 240 behind the shield 222 may vent warmer air out through an upper elongated slot 242 defined within the top wall 232 of the shield 222. Likewise, an elongated slot 244 is defined into the air space 240 in the bottom wall 236 of the shield 222. Heated air may thus escape through the top elongated slot 242 and cooler air may enter the air space 240 through the bottom elongated slot 244. As shown in FIG. 7, the shield 222 also preferably defines a rearwardly projecting cylindrical flange 246 that extends into the outer wall 18 to allow passage of control and power wiring between the interior of the heating unit 12 and the interior of the housing 210.

In a similar fashion, air circulation is promoted through the housing 210 through a set of openings, preferably defined between the upper portion and the bottom of the housing 210. In particular, a plurality of openings 250 are defined within the bottom wall 230 of the housing 210. An elongated upper slot 252 is provided on the front face 224 of the housing 210. This allows air to freely circulate behind the control panel 224 and assist in the dissipation of heat from the circuit board 254 and its electronic componentry within the housing 210. Preferably, a heat sink 256 is provided as shown in FIG. 7 and positioned between the circuit board 254 and the front panel 224 inside the housing 210. The sink 256 preferably includes a plurality of openings defined therein to allow air to circulate between the openings 250 and 252 and through and around the heat sink 256 to dissipate additional heat therefrom. Also shown is the relative position of cooking unit 14.

Figure 8:
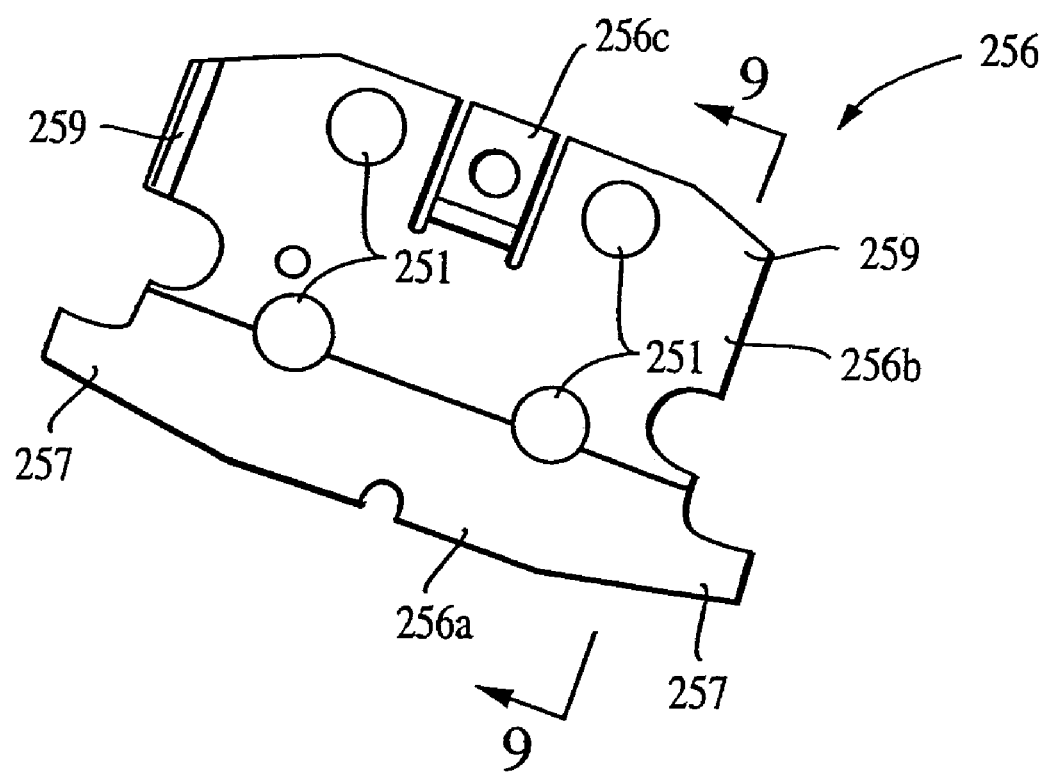
FIG. 8 is a plan view of a heat sink 256 as utilized in the embodiment of FIG. 4.
Figure 9:
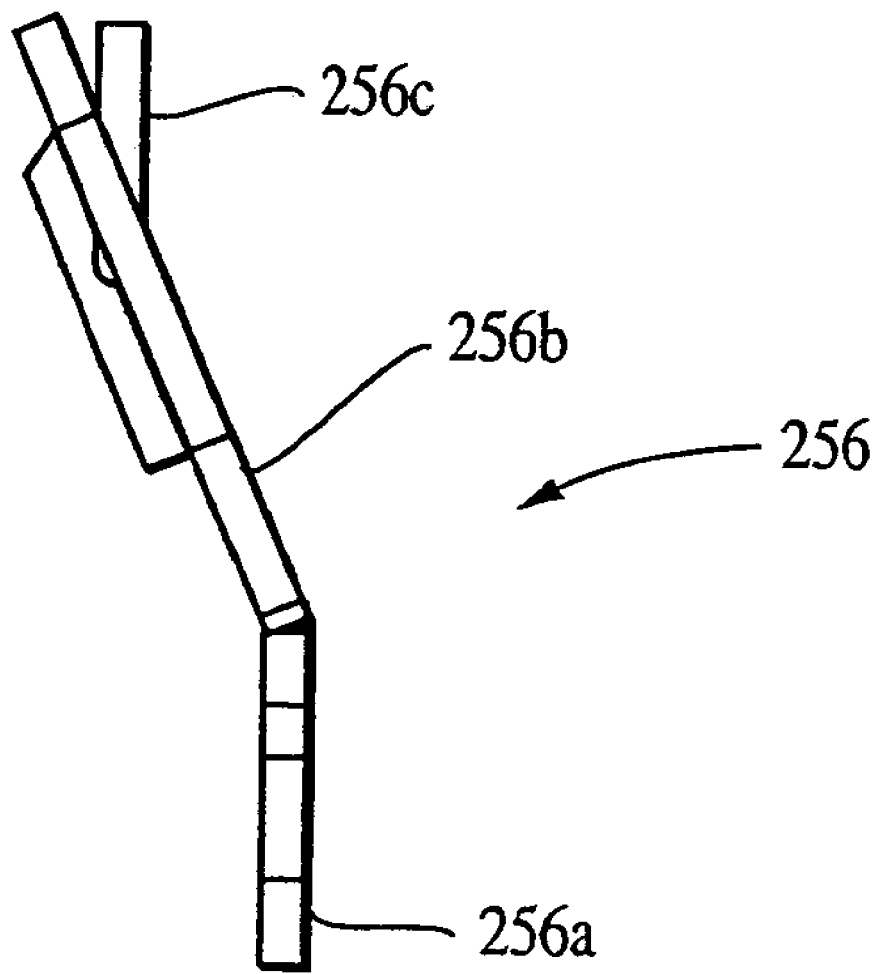
FIG. 9 is a side view taken along a line 9-9 of FIG. 8.

FIGS. 8 and 9 show a detailed view of the heat sink 256. Preferably, the heat sink is machined from 0.063 inch thick 3003-0 anodized aluminum. The heat sink 256 is preferably bent at a 160 degree angle between a bottom flange portion 256a and an upper portion 256b. A centrally located retaining tab portion 256c is bent parallel with the lower portion 256a, and the portions 256a and 256c are used for attachment of the heat sink 256 to the rear side of the housing 210 interior via the rearwardly projecting screw receiving portions 258. To maximize the dissipation of heat, a plurality of winged sections 257 and 259 are provided on the heat sink 256 and extend outwardly from a center portion 256a of the heat sink 256. A plurality of openings are defined through the heat sink 256 to allow the fingers 258 of the control panel cantilevered portions 264, 266 to project through the heat sink and contact the circuit board 254 at the rear of the housing 210. The openings 251 also facilitate cooling air flow through and past the heat sink 256 to further dissipate heat therefrom.

Figure 10:
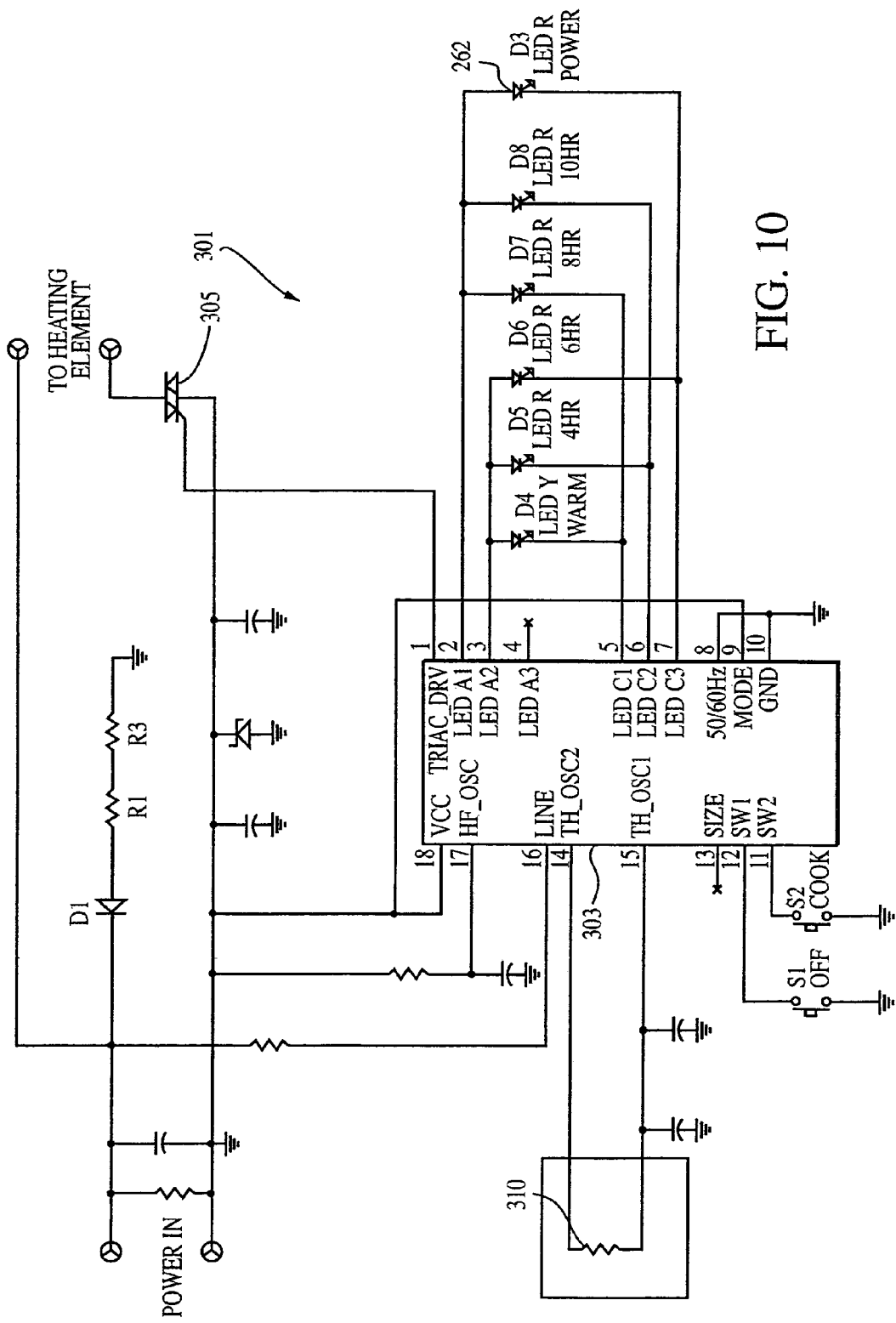
FIGS. 10 and 13 are schematic circuit diagrams showing the circuitry and components implemented in preferred embodiments.

The circuit board 254 mounts circuitry and logic allowing the user of the appliance 10 to electronically control and program cooking cycles and temperature. A schematic diagram of the electronic circuitry and components is shown in FIG. 10. The diagram shows a preferred exemplary circuit incorporating preferred components as utilized in the preferred embodiment of the present invention. One skilled in the art will recognize that the componentry illustrated herein is exemplary only and that many other components may be substituted to achieve the functions described herein. FIG.

10 includes labels for each of the components of the circuit, and only major components will be described herein.

First, as shown in the diagram, the preferred circuit 301 is preferably built around a microprocessor controller. In a preferred embodiment, the microprocessor controller is an application-specific integrated circuit (A-SIC) programmable controller 303 with little more than the specific capabilities indicated in FIG. 10. Having only the needed capabilities on the chip lends a cost advantage not found in integrated circuits which typically have greater capabilities and greater cost. ASIC programmable controller 303 preferably also includes an algorithm for controlling the operation of the slow-cooker, and at least enough memory to store the algorithm in ROM (read only memory). The outputs for controller 303 output preferably include drivers for 6 LED indicators 262 (labeled D3-D8) as shown. These LED indicators may be assigned labels as follows:

| LED | Indicates |
| --- | --- |
| D3 | Power On |
| D4 | WARM |
| D5 | 4 HOUR |
| D6 | 6 HOUR |
| D7 | 8 HOUR |
| D8 | 10 HOUR |

Two momentary pushbutton contact switches S1 and S2 are used to trigger the "Off" and "Cook" features, respectively, as will be described in the cooking procedure below. Of course, other indicators and switches may be substituted. Note that while examples are given, the circuitry may be implemented in numerous ways, as is well-known in the art, to accomplish the varying programming modes described below.

The temperature of the cooking appliance is measured using a thermistor 310, or other temperature indicating and controlling device, which is connected externally of the circuit board to the underside of the bottom of the heating chamber. A retention clip 320, shown in FIG. 7, is utilized to hold the thermistor in thermal contact with the bottom 16. In a preferred embodiment, the appliance uses a model USX1732 thermistor manufactured by U.S. Sensor, Inc.

Triac 305 is utilized to switch the power supplied to the heating elements of the appliance. Preferably, the triac is of an isolated tab type and includes a heat sink tab that is fastenable to the heat sink 256 shown in FIGS. 8 and 9. Preferably, the Triac is mounted separately to one of the mounting holes on the center portion 256a of the heat sink 256 so that the tab is in thermal contact with the heat sink 256 to dissipate heat generated from its current controlling function. Most of the other components of the circuit 301 are mounted on a conventional printed circuit board 254 (FIG. 7).

Figure 11:
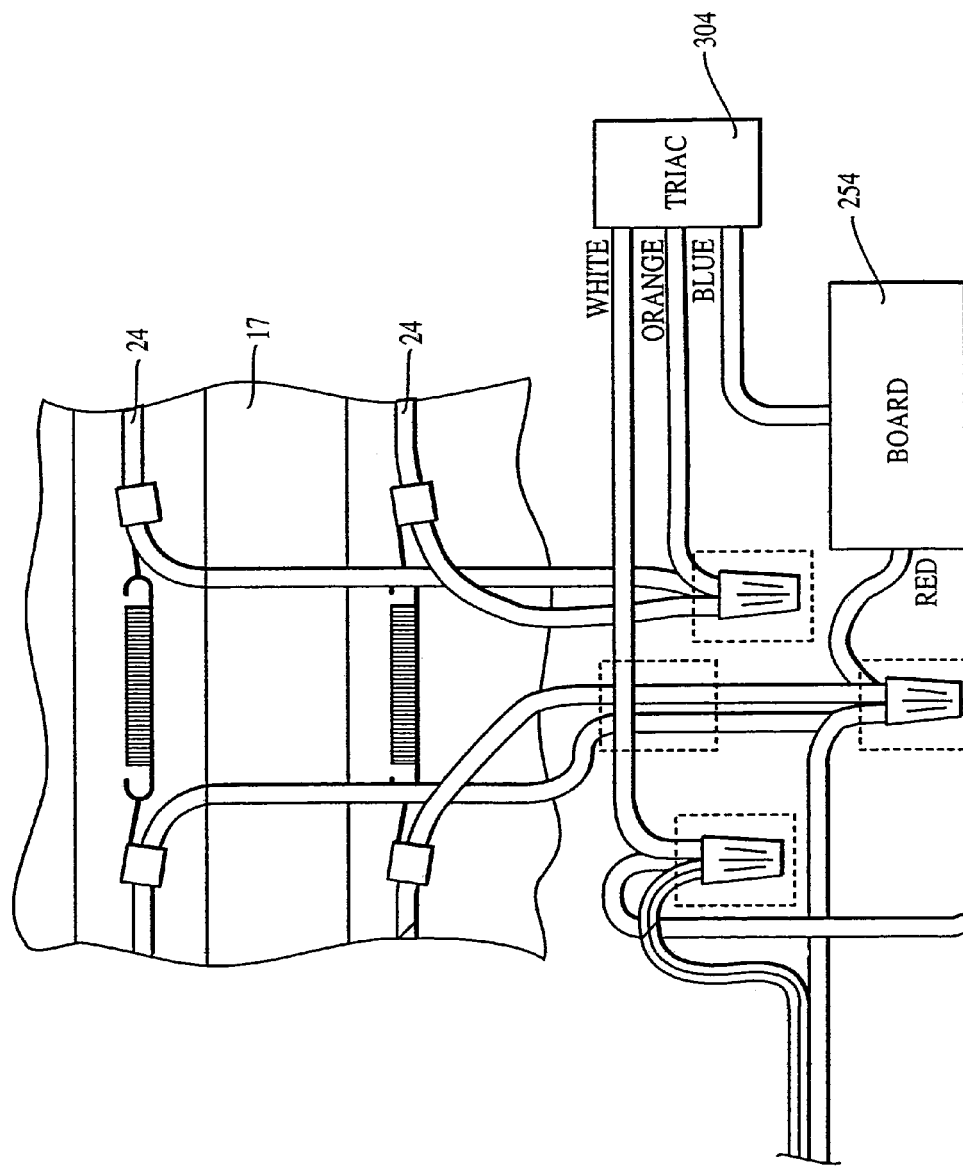
FIG. 11 is a wiring diagram showing some of the electric componentry of the preferred embodiment.

FIG. 11 shows the wiring of the external Triac 305 in relation to the circuit board 254 and heating elements 24. As shown in the Figure, the heating elements 24 are in thermal contact with and wrapping around the interior sidewall 17 of the heating unit.

The operation of the appliance 10 is as follows. The programmable circuitry 301 allows the user to set both the temperature and desired time for cooking. The functions of the switches S1 and S2, which are activatable via the cantilevered portions 264 and 266 of the control panel 224, are as follows:

| S1. | OFF pushbutton - turns the appliance 10 off. |
| --- | --- |
| S2. | COOK pushbutton - subsequent pushes of the button cycle through 4 hour, 6 hour, 8 hour and 10 hour cook times. |

When the unit is plugged in, the power "on" indicator flashes. The user then pushes the COOK button (switch S2) to set the temperature and cooking time. As the user pushes the COOK switch S2, the LED's D5-D8 illuminate to indicate the corresponding time setting as follows.

| LEDs | |
| --- | --- |
| D3. | POWER - on when appliance 10 is in cook or warm modes. |
| D5. | 4 HOUR - on when appliance is in 4-hour cook mode |
| D6. | 6 HOUR - on when appliance is in 6-hour cook mode |
| D7. | 8 HOUR - on when appliance is in 8-hour cook mode |
| D8. | 10 HOUR - on when appliance is in 10-hour cook mode |
| D4. | WARM - on when appliance is at full power, cycled based on thermistor input. |

Thus, subsequent pushes of the COOK switch S2 activate different cooking modes, as shown by the 6 HOUR, 8 HOUR and 10 HOUR LEDs 262 on the control panel 224. If the COOK switch S2 is pressed in the 10 HOUR mode, the control 200 recycles to the 4 HOUR cooking mode, and its indicator.

In general, full power will be applied to the heating element 24 until the time corresponding to the illuminated LED elapses, after which the power to the heating element 24 will be cycled based on the thermistor input. In one embodiment, the controller uses the thermistor input to maintain the food at a temperature between 140° F. and 160° F. The WARM indicator then illuminates and all cook time indicators extinguish. The choices of operation are: 4 or 6 hours on a HI temperature, and 8 to 10 hours on a lower temperature setting. Once the user selects the desired setting, the appliance 10 starts the cooking operation. Once the time setting has expired, the appliance 10 automatically reduces power to the heating element 24 to put the unit in a WARM setting. The unit will stay in the WARM setting until the user pushes the OFF button or unplugs the unit. Of course, other programming schemes are possible.

Preferably, the user cannot set the unit initially in the WARM setting. The system will only go to WARM after one of the time functions has expired. This avoids possible food safety problems that may be associated with cooking food only on the WARM setting. In other embodiments, the controller may allow a user to set the programmable slow cooker to a WARM setting initially. Pressing the OFF switch S1 any time the unit is on preferably removes power from the heating element 24 and extinguishes all indicator LEDs 262.

Figure 12:
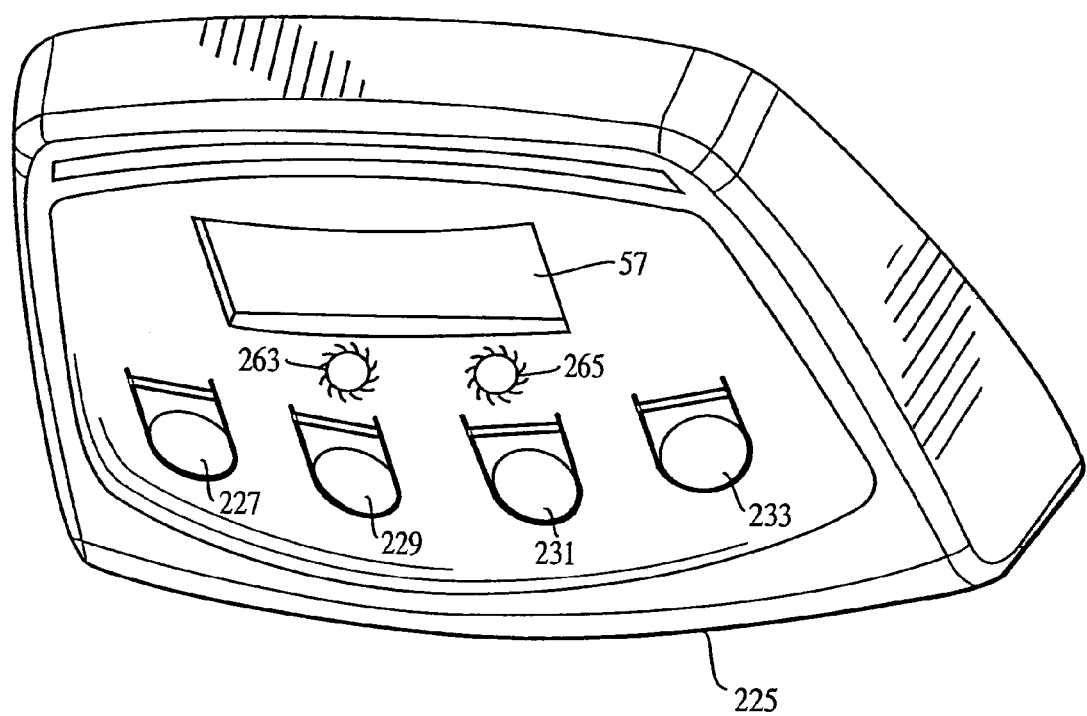
FIG. 12 is an embodiment of the front panel.
Figure 13:
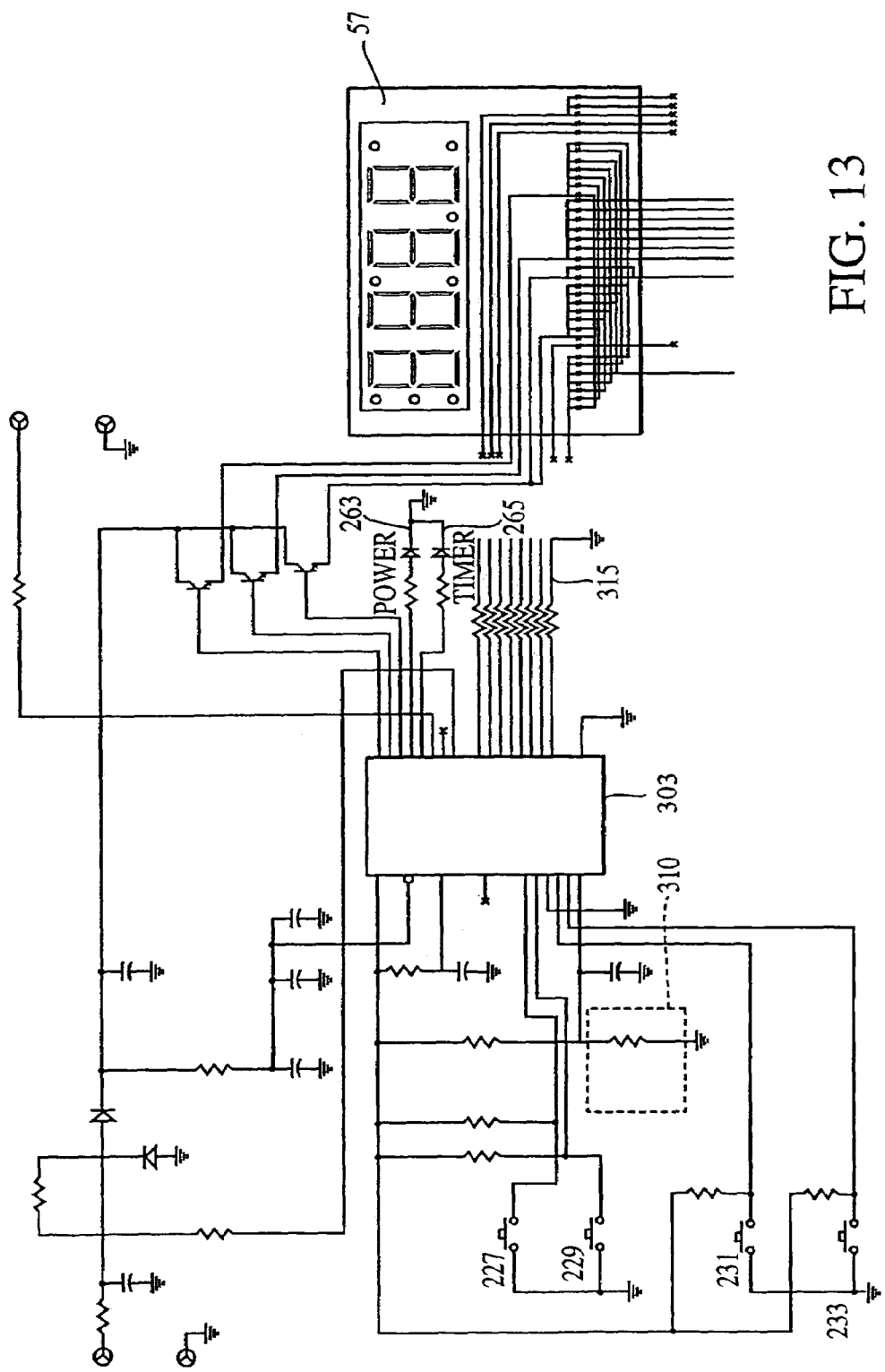

In another embodiment, the slow-cooker appliance utilizes four push-button switches, rather than two, to set times and temperatures for cooking. An exemplary control panel is depicted in FIG. 12, with control circuitry in FIG. 13. Four momentary pushbutton contact switches 227, 229, 231, 233 are used to trigger various power and setting functions as will be described in the cooking procedure below. Of course, other numbers or types of indicators and switches may be substituted as well. FIG. 13 shows circuitry applicable to such an embodiment, incorporating ASIC controller 303, external temperature element 310, digital readout 57, and Power LED 263 and Timer LED 265. The Power LED indicates power is present at the microprocessor controller and the Timer LED indicates that the Timer function is on and working.

The operation of the appliance is as follows. The programmable circuitry allows the user to set both the temperature and the desired cooking time. The functions of the switches 227, 229, 231, 233 on an alternative embodiment of a control panel user interface 225, are as follows:

| | | |
|---|---|---|
| 227. | ON and OFF power pushbuttons - turn the appliance on and off. | |
| 229. | TIMER pushbutton - activates stepped timer. | |
| 231. | UP pushbutton - increases displayed numerical value. | |
| 233. | DOWN pushbutton - decreases displayed numerical value. | |

When the unit is plugged in, the unit defaults to 150-degrees F. as shown on the digital display 57. The user may adjust the desired cooking temperature in 25-degree increments using the UP 231 button or the DOWN button 233, with 150 degrees Fahrenheit as a minimum temperature. Once the user has selected the specific temperature, the appliance will start the cooking process.

The user may also select the TIMER Mode by pressing the TIMER button 229. In TIMER mode, the controller defaults to 4 hours. The user can use the UP or DOWN controls to increase or decrease the time in 30-minute increments. Other increments may also be used. Once the time is set, the controller 303 will count down the time remaining for cooking in 1 minute increments until the unit "times out". At that time, the unit will switch into the "WARM" mode until the OFF button is pushed or a new cook time/cycle is selected.

In the WARM mode, the temperature is read periodically by the thermistor or other temperature element and relayed to the controller. The reading is checked at 4-second intervals. If the temperature is above or equal to the set point, power is removed. If it is below the set point, power is applied to the heating element 32. Of course, the circuitry can be modified as desired to achieve other cooking methods and modes.

Another embodiment of the slow-cooker appliance adds a piezobuzzer to the circuitry. A piezobuzzer is simply an electrically-activated buzzer that can be programmed to emit a sound at desired moments. In one embodiment, a piezobuzzer may be installed as an output 315, controlled by the controller 303, as shown in FIG. 13, and programmed to emit a sound when desired. In one embodiment, the buzzer may beep to provide feedback to a user when a pushbutton is pushed. The slow-cooker may also be programmed to emit a sound to indicate the end of the cooking time. The buzzer may also be used to emit sounds at other desired times.

It is intended that the foregoing description illustrates rather than limits this invention, and that it is the following claims, including all equivalents, which define this invention. Of course, it should be understood that a wide range of changes and modifications may be made to the embodiments described above. Accordingly, it is the intention of the applicants to protect all variations and modifications within the valid scope of the present invention. It is intended that the invention be defined by the following claims, including all equivalents.

What is claimed is:

1. A programmable slow-cooker appliance, comprising:
   a heating unit;
   a cooking unit adapted to fit at least partially within the heating unit;
   a controller housing mounted to an outside of the heating unit; and
   an application-specific integrated circuit controller mounted to the housing to control the heating unit, wherein the housing is configured to convect heat away from the controller.

2. The slow-cooker appliance of claim 1, wherein the housing is an enclosure for at least a portion of the controller.

3. The slow-cooker appliance of claim 2, wherein the controller housing insulates the controller from the heating unit.

4. The slow-cooker appliance of claim 3, wherein the housing further comprises a heat shield, and the heat shield is made from a material selected from at least one of thermoplastics and insulating materials.

5. The slow-cooker appliance of claim 4, wherein the housing defines ventilation openings configured to allow air to flow into and out of said housing.

6. The slow-cooker appliance of claim 5, wherein the housing includes at least a pair of slots defined in an upper and lower part of the housing to define airflow thru the slots and behind the controller.

7. The slow-cooker appliance of claim 1, wherein the controller further comprises control elements and a display.

8. The slow-cooker appliance of claim 7, wherein the control elements are selected from the group consisting of a control panel, push-buttons, switches, and a digital readout.

9. The slow-cooker appliance of claim 1, further comprising a temperature measuring device in communication with said controller.

10. The slow-cooker appliance of claim 1, further comprising a piezobuzzer.

11. The slow-cooker appliance of claim 1, wherein the controller further comprises a memory and an algorithm stored within the memory.

12. A plastic control housing for a slow-cooker heating unit, said housing comprising:
    a front wall;
    a bottom wall defining at least one lower opening, the bottom wall attached to the front wall;
    a top wall defining at least one upper opening, the top wall attached to the front wall; and
    a circuit board mounted behind the front wall, the circuit board apart from a wall of the heating unit.

13. The control housing of claim 12, further comprising a heat sink between the circuit board and the front wall.

14. A method of using a programmable slow-cooker appliance, the method comprising:
    providing a food item;
    placing the food item into a cooking unit of the slow-cooker appliance;
    selecting a cooking temperature and time using an application specific integrated circuit controller mounted to a housing for the controller on a sidewall of the slow-cooker appliance;
    setting the cooking temperature by default by setting a cooking time; and
    changing the temperature automatically to a lower temperature after the selected time.

15. The method of claim 14, further comprising notifying a user with illuminated indicators that the slow-cooker appliance is powered and that the timer is active.

16. The method of claim 14, wherein the cooking time is selected from the group consisting of 4 hours, 6 hours, 8 hours and 10 hours.

17. The method of claim 14, wherein the temperature and time are set in increments.

18. The method of claim 14, further comprising cooling the electronic circuitry of the application specific integrated circuit controller via a chimney effect.

19. The method of claim 14, further comprising emitting a sound.

20. A programmable slow-cooker appliance comprising:
a heating unit including a bottom and a continuous outer sidewall and an inner sidewall, the bottom and inner sidewall defining a well-like heating chamber having an open top end, a heating element positioned between the outer sidewall and the inner sidewall for providing heat to said well-like chamber, and a pair of handles extending in opposite directions from said continuous side wall;
a ceramic cooking unit having a lip adapted to be supported by said heating unit and to extend at least partially within said well-like heating chamber;
a control panel provided on said outer sidewall of said heating unit, and;
positioned between said handles of said heating unit; and
a programmable circuit operatively associated with said control panel, said programmable circuit being configured to cause the heating element to operate in a plurality of cooking modes and to allow a user via the control panel to set cooking time and temperature, wherein upon expiration of a cooking time set by the user, the programmable circuit automatically reduces power to the heating element to a warm mode to maintain a food item in the ceramic cooking unit at a predetermined temperature less than the cooking temperature, and wherein the slow-cooker cannot be set to the warm mode when setting the cooking time and temperature.

21. A programmable slow-cooker appliance as described in claim 20, wherein said cooking modes include a first and second cooking temperature and the first cooking temperature is lower than the second cooking temperature.

22. A programmable slow-cooker appliance as described in claim 20, wherein the temperature of the warm mode is less than the first cooking temperature.

23. A programmable slow-cooker appliance as described in claim 20, including a thermistor mounted to said heating unit and connected to said programmable circuit.

24. A programmable slow-cooker appliance as described in claim 20, wherein said programmable circuit includes a microprocessor-based controller.

25. A programmable slow-cooker appliance as described in claim 20, wherein said programmable circuit includes a temperature sensor operatively coupled to said microprocessor-based controller.

26. A programmable slow-cooker appliance as described in claim 20, wherein said programmable circuit is configured to default to a cooking mode when electrical power is initially applied thereto.

27. A method of using a programmable slow-cooker appliance, the method comprising:
providing a food item;
placing the food item into a cooking unit of the slow-cooker appliance;
selecting a cooking temperature and time using an application specific integrated circuit controller mounted to a housing for the controller on a sidewall of the slow-cooker appliance;
changing the temperature automatically to a lower temperature after the selected time; and
cooling the electronic circuitry of the application specific integrated circuit controller via a chimney effect.

28. A programmable slow-cooker appliance comprising:
a heating unit including a bottom and a continuous outer sidewall and an inner sidewall, the bottom and inner sidewall defining a well-like heating chamber having an open top end, a heating element positioned between the outer sidewall and the inner sidewall for providing heat to said well-like chamber, and a pair of handles extending in opposite directions from said continuous side wall;
a ceramic cooking unit having a lip adapted to be supported by said heating unit and to extend at least partially within said well-like heating chamber;
a housing provided on said outer sidewall of said heating unit, said housing being positioned between said handles of said heating unit and including a control panel; and
a programmable circuit operatively associated with said control panel, said programmable circuit being configured to cause the heating element to operate in a plurality of cooking modes and to allow a user to set cooking time and temperature, wherein upon expiration of a cooking time set by the user, the programmable circuit automatically reduces power to the heating element to a warm mode to maintain a food item in the ceramic cooking unit at a predetermined temperature less than the cooking temperature and wherein said circuit is configured to prevent a user from initially setting the slow-cooker to warm mode.

29. A programmable slow-cooker appliance comprising:
a heating unit including a bottom and a continuous outer sidewall and an inner sidewall, the bottom and inner sidewall defining a well-like heating chamber having an open top end, a heating element positioned between the outer sidewall and the inner sidewall for providing heat to said well-like chamber, and a pair of handles extending in opposite directions from said continuous side wall;
a ceramic cooking unit having a lip adapted to be supported by said heating unit and to extend at least partially within said well-like heating chamber;
a housing provided on said outer sidewall of said heating unit, said housing being positioned between said handles of said heating unit and including a control panel, said housing including a plurality of vent openings; and
a programmable circuit operatively associated with said control panel, said circuit being positioned within said housing such that said circuit is cooled by air flowing into and out of said openings when said appliance is operated, said programmable circuit being configured to cause the heating element to operate in a plurality of cooking modes and to allow a user to set cooking time and temperature, wherein upon expiration of a cooking time set by the user, the programmable circuit automatically reduces power to the heating element to a warm mode to maintain a food item in the ceramic cooking unit at a predetermined temperature less than the cooking temperature.

30. A programmable slow-cooker appliance comprising:

a heating unit including a bottom and a continuous outer sidewall and an inner sidewall, the bottom and inner sidewall defining a well-like heating chamber having an open top end, a heating element positioned between the outer sidewall and the inner sidewall for providing heat to said well-like chamber, and a pair of handles extending in opposite directions from said continuous side wall;

a ceramic cooking unit having a lip adapted to be supported by said heating unit and to extend at least partially within said well-like heating chamber;

a housing provided on said outer sidewall of said heating unit, said housing being positioned between said handles of said heating unit and including a control panel; and a programmable circuit operatively associated with said control panel, said programmable circuit being configured to cause the heating element to operate in a plurality of cooking modes and to allow a user to set cooking time and temperature, wherein upon expiration of a cooking time set by the user, the programmable circuit automatically reduces power to the heating element to a warm mode to maintain a food item in the ceramic cooking unit at a predetermined temperature less than the cooking temperature, and said circuit being configured to default to a cooking mode when electrical power is initially applied thereto.

* * * * *